United States Patent
Abraham et al.

(10) Patent No.: US 8,232,667 B2
(45) Date of Patent: Jul. 31, 2012

(54) SYSTEM AND METHOD FOR DATA TRANSMISSION OVER A POWER LINE OF A SWITCH MODE POWER SUPPLY BY FREQUENCY MODULATING THE SWITCH FREQUENCY THEREOF

(75) Inventors: Claude Abraham, Stow, OH (US); Marv Hamdan, North Olmsted, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1841 days.

(21) Appl. No.: 11/361,594

(22) Filed: Feb. 24, 2006

(65) Prior Publication Data
US 2007/0202839 A1 Aug. 30, 2007

(51) Int. Cl.
*H04B 3/54* (2006.01)
(52) U.S. Cl. .................................. 307/3; 307/4
(58) Field of Classification Search ............ 307/3, 4
See application file for complete search history.

(56) References Cited

U.S. PATENT DOCUMENTS

| | | | | |
|---|---|---|---|---|
| 3,819,863 | A | * | 6/1974 | Slaght .................. 379/106.02 |
| 4,740,952 | A | * | 4/1988 | Vernieres et al. ............ 370/284 |
| 5,717,685 | A | | 2/1998 | Abraham |
| 6,127,939 | A | | 10/2000 | Lesesky et al. |
| 6,549,120 | B1 | * | 4/2003 | de Buda ..................... 370/482 |
| 6,668,328 | B1 | | 12/2003 | Bell |
| RE41,596 | E | * | 8/2010 | Gizara ...................... 307/151 |

OTHER PUBLICATIONS

The International Search Report for PCT/US/2006/048516, mailed Jul. 23, 2008.
The Written Opinion of the International Searching Authority for PCT/US/2006/048516, mailed Jul. 23, 2008.
"EMI Reduction IC for Switching Power Supplies", Product Brief, Jan. 2003.
"BiCMOS Low-Power Current-Mode PWM Controller", Production Data Information, Aug. 2001—Revised Sep. 2003—Texas Instruments.
"Negative Output Flyback Pulse Width Modulator", Production Data Information, Mar. 1999—Revised Aug. 2001—Texas Instruments.

* cited by examiner

*Primary Examiner* — Jared Fureman
*Assistant Examiner* — Adi Amrany
(74) *Attorney, Agent, or Firm* — Eugene E. Clair; Cheryl L. Greenly

(57) ABSTRACT

A method of transmitting data over a power line of a switch mode power supply system includes encoding a switch frequency of the switch mode power supply with the data. A ripple voltage is generated at the encoded switch frequency relative to a voltage generated by the switch mode power supply. The ripple voltage is conducted over the power line of the system. The ripple voltage is de-coupled from the power line and the data is decoded from the encoded switch frequency of the coupled ripple voltage.

19 Claims, 4 Drawing Sheets

SYSTEM AND METHOD FOR DATA TRANSMISSION OVER A POWER LINE OF A SWITCH MODE POWER SUPPLY BY FREQUENCY MODULATING THE SWITCH FREQUENCY THEREOF

BACKGROUND OF THE INVENTION

The present invention is related to data transmission over power lines, in general, and more particularly, to the data transmission over a power line of a switch mode power supply (SMPS) by frequency modulating the switch frequency thereof.

In existing systems for data transmission over a power line, the information or data signal is encoded by amplitude modulation (AM) or frequency modulation (FM), and then, coupled onto the power line at the transmitting end via a power line coupling network including capacitors and/or transformers, for example. At the receiving end of the power line, capacitors or transformers couple the encoded data signal from the power line to a decoding network to extract the transmitted data. An example of such an existing system is disclosed in the U.S. Pat. No. 5,717,685, entitled "Transformer Coupler for Communication Over Various Lines", patented Feb. 10, 1998 to Charles Abraham. Note that, with all such systems, coupling capacitors or transformers are needed at both the transmitting end and receiving ends of the power line. Also, with these existing systems, reflected impedances must be considered as they may load the encoder/decoder circuitry. In such existing systems, the encoded data signal creates an undesirable ripple voltage frequency over the power line. The present invention intends to overcome these drawbacks of the existing systems.

SUMMARY OF THE INVENTION

In accordance with one aspect of the present invention, a method of transmitting data over a power line of a switch mode power supply system comprises the steps of: encoding a switch frequency of the switch mode power supply with the data; generating a ripple voltage at the encoded switch frequency by the switch mode power supply; conducting the generated ripple voltage over the power line of the system; coupling the ripple voltage from the power line; and decoding the data from the encoded switch frequency of the coupled ripple voltage.

In accordance with another aspect of the present invention, a system for transmitting data over a power line comprises: a switch mode power supply operative at a switch frequency for generating a ripple voltage over the power line at the switch frequency; first circuit for encoding the switch frequency of the ripple voltage with the data; and second circuit for coupling the ripple voltage from the power line and for decoding the data from the encoded switch frequency of the coupled ripple voltage.

In accordance with yet another aspect of the present invention, a vision system for a commercial vehicle comprises: at least one camera for viewing scenes surrounding the vehicle; a switch mode power supply for providing power at a regulated voltage potential over a power line to said at least one camera, the switch mode power supply operative at a switch frequency for generating a ripple voltage over the power line at the switch frequency thereof; first circuit for encoding the switch frequency of the switch mode power supply with data for controlling the at least one camera; and second circuit, coupled to the power line and at least one camera, for coupling the ripple voltage from the power line and for decoding the data from the encoded switch frequency of the coupled ripple voltage to control the at least one camera therewith.

DETAILED DESCRIPTION OF THE DRAWINGS

Figure 1:
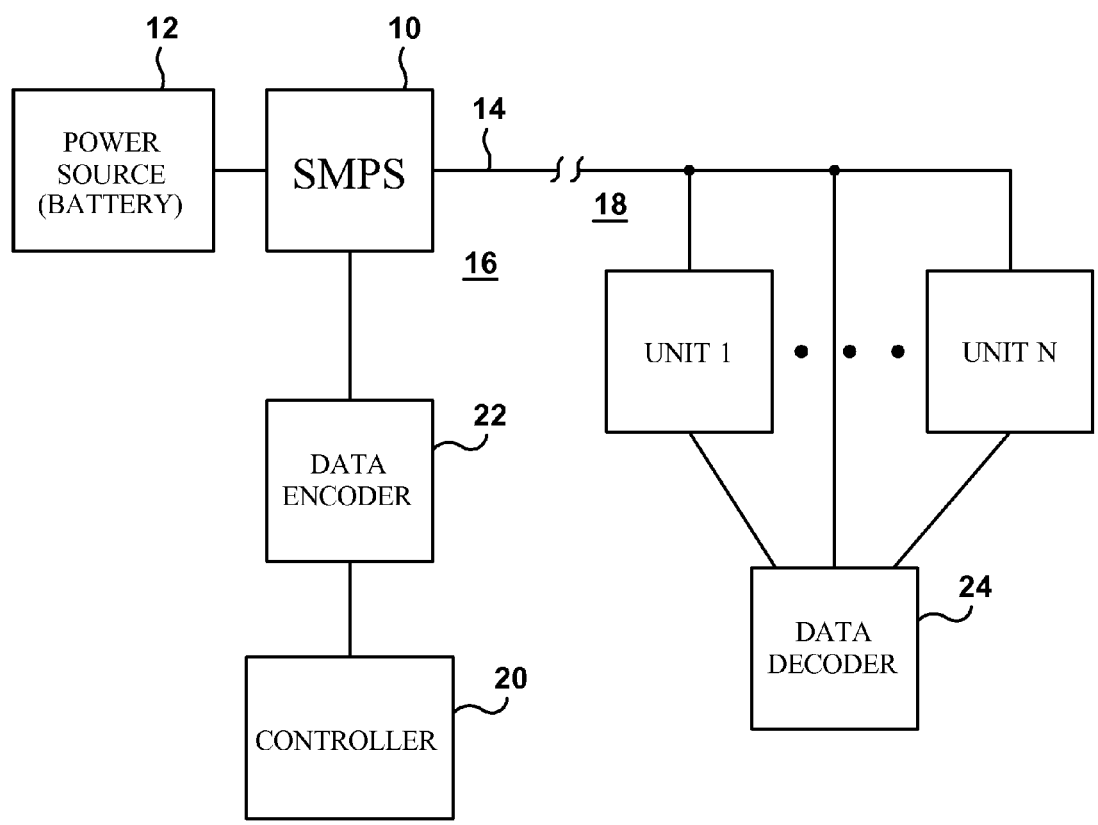
FIG. 1 is a block diagram schematic of a SMPS system suitable for embodying at least one aspect of the present invention.

The present embodiment uses a power line of a SMPS to transmit data signal information between points without the addition of new wires and without the need of additional power line coupling networks as noted herein above. An exemplary SMPS system is shown in the block diagram of FIG. 1. Generally, the SMPS 10 switches a voltage of a power source 12, which may be a battery, for example, between the voltage potential of the source 12 and a lower voltage potential, like ground potential, for example, at a predetermined fixed frequency. The switched or chopped voltage potential is regulated and filtered in the SMPS 10 to produce a regulated voltage potential which is distributed over one or more power lines 14 to power a plurality of electrical units 1, . . . , N of the system. The regulated power line voltage potential of the power line may be lower or higher than the battery voltage potential. In a commercial vehicle application, the battery voltage potential may be at 13.8 volts when charged and the regulated voltage potential over the power line 14 may be approximately 12 volts.

This voltage switching in the SMPS 10 is typically performed by a control circuit (not shown) that includes a discrete timing capacitor which is charged by a fixed current generated by an internal current source. When the voltage on the timing capacitor reaches a threshold voltage, the control circuit is operative to quickly discharge it and repeat the process. This charging and discharging of the timing capacitor results in a saw tooth wave form having a period Tsw, which may be set by the formula $IT=Q=CV$, where I is the charging current, C is the value of the timing capacitor, V is the threshold voltage and T is the period Tsw which is equal to $1/f_{SW}$. This saw tooth waveform may be used by the SMPS 10 to switch or chop the source voltage wherein the switching frequency $f_{sw}$ may be set by the expression CV/I. Normally, this switching frequency is a fixed value (rest frequency). Despite the fact that in the SMPS 10, the switched regulated voltage potential is filtered at the output thereof, an undesirable ripple voltage at the fixed switching frequency remains on the regulated voltage distributed over the power lines 14.

An example of a SMPS is found in the Texas Instrument specification entitled "BiCMOS Low-Power Current-Mode PWM Controller" dated September 2003, which is incorporated herein by reference for providing a description of an exemplary SMPS in greater detail.

The present embodiment makes use of the undesirable voltage ripple over the power line, which is a by-product of the operation of the SMPS 10, to transmit data content from a transmitting end 16 of the power line 14 to a receiving end 18. One technique to add data content produced by a controller 20 to the SMPS ripple voltage is by data encoding the voltage ripple at the transmitting end 16 using a data encoder 22 disposed between the controller 20 and SMPS 10. Accordingly, at the receiving end 18, the data encoded ripple voltage may be decoded by a data decoder 24 which may pass the decoded data information to the units 1, ..., N, for example.

In a commercial vehicle employing a vision system, for example, the units 1, ..., N of the present embodiment may each comprise a video camera and the units may be disposed about the vehicle, each for monitoring a specific scene from the vehicle. In this example, the controller 20 may transmit control data over the power line 14 using the ripple voltage thereof to turn the video cameras on and off.

One technique for data encoding the ripple voltage is through frequency modulation (FM) of the switch frequency of the ripple voltage by the data encoder 22. Thus, a FM data encoded ripple voltage may be transmitted from the SMPS 10 at the transmitting end 16 over the power line 14 to the receiving end 18. At the receiving end 18, the data decoder 24 may de-couple and amplify the FM encoded ripple voltage and FM decode the same. The decoded data information can then be processed and deployed to the units 1, ..., N. A useful additional benefit gained by this technique is an improved EMI/RFI performance since the SMPS switch frequency is variable vs. fixed. Thus, noise from the switch frequency is spread out over a broad spectrum, and filtering is eased.

Figure 2:
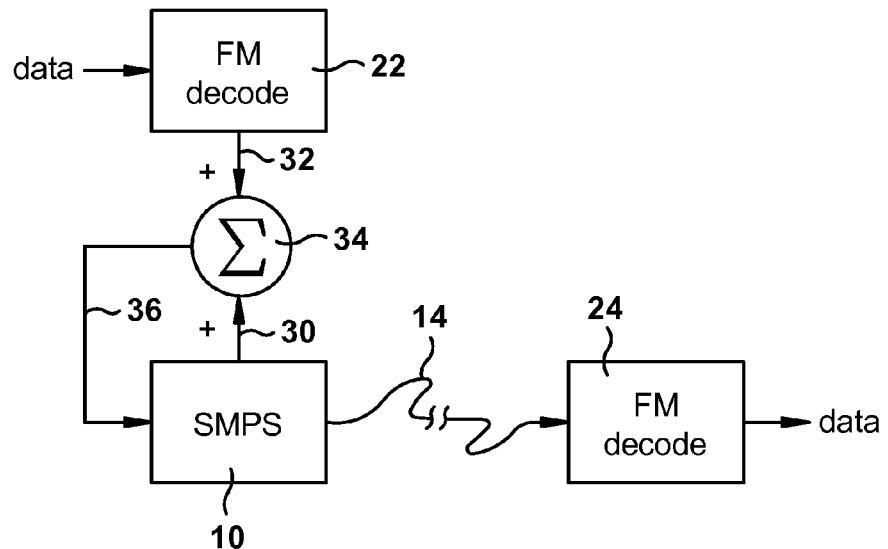
FIG. 2 is a block diagram schematic of an embodiment for FM encoding a switch frequency of the ripple voltage of an SMPS by modulating the charging current of the saw tooth wave form which produces the switching frequency thereof.

One way to FM encode the switch frequency of the ripple voltage of the SMPS 10 is to modulate the charging current of the saw tooth wave form which produces the switching frequency $f_{SW}$ in the SMPS 10. An exemplary embodiment of such a technique is shown in the block diagram schematic of FIG. 2. Referring to FIG. 2, the SMPS 10 may generate a fixed charging current, denoted by the arrowed line 30, for producing the switching frequency (rest frequency) as noted above. The controller 20 may provide data content for FM encoding to the FM encoder 22 for generating a modulating current, denoted by the arrowed line 32, which may be mixed with the fixed charging current 30 in a mixer unit 34 which may be a summing unit, for example. A composite charging current, denoted by the arrowed line 36, produced from the mixing of the modulating and fixed charging currents is used to produce an FM switching frequency in the SMPS 10.

Figure 3:
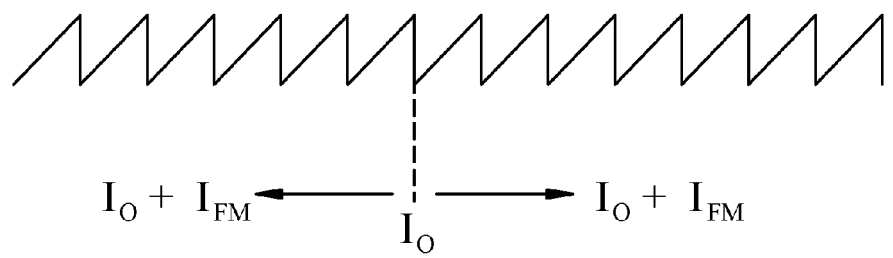
FIG. 3 is an illustration of the variation in the saw tooth wave form caused by the modulation of charging current.

As illustrated in FIG. 3, when modulating current $I_{FM}$ is added to a fixed charging current Io, the resultant saw tooth wave form decreases in period Tsw and the switching frequency $f_{sw}$ increases inversely proportional to the decrease in Tsw. Likewise, when modulating current $I_{FM}$ is subtracted from the fixed charging current Io, the resultant saw tooth wave form increases in period Tsw and the switching frequency $f_{sw}$ decreases inversely proportional to the increase in Tsw. In this manner, the switching frequency of the ripple voltage may be FM varied according to the data content about a rest frequency based on Io.

Figure 4:
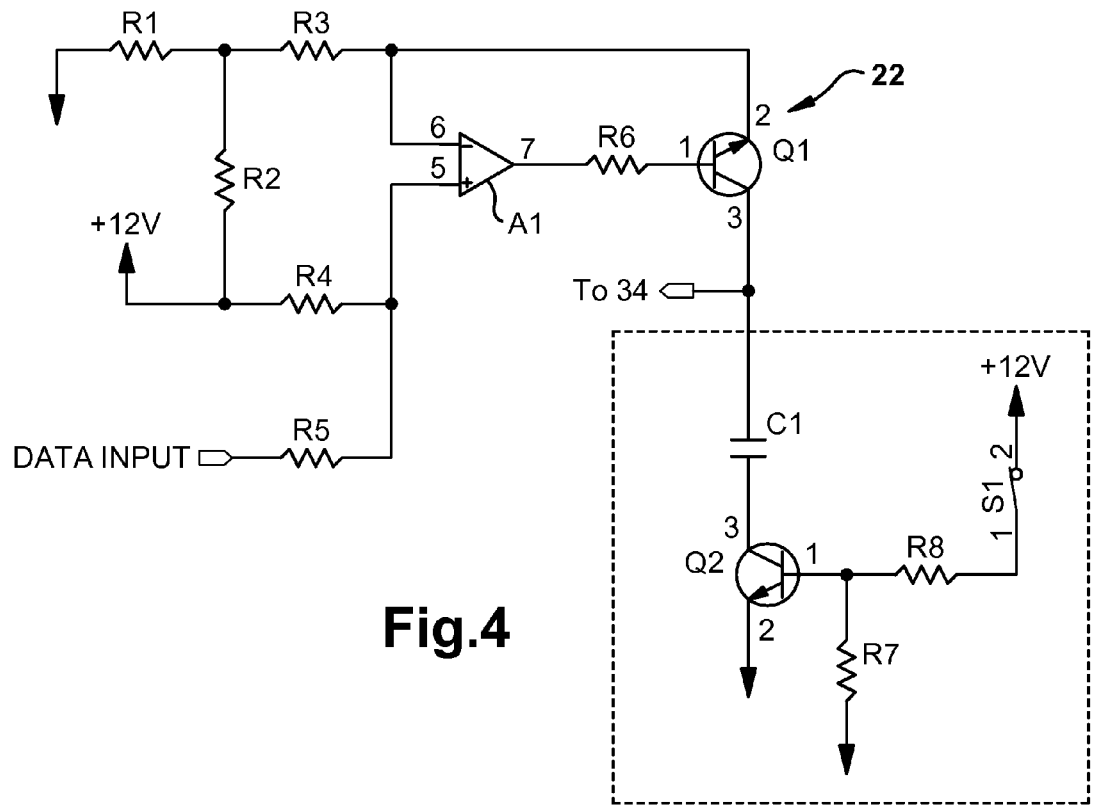
FIG. 4 is a circuit schematic of an exemplary circuit for producing the modulating current according to data content.

An exemplary circuit for producing the modulating current $I_{FM}$ according to the data content is shown in FIG. 4. Referring to FIG. 4, a voltage divider network comprising resistors R1 and R2 is connected between a regulated supply, which may be +12 volts, for example, and ground potential, one end of R1 being coupled to ground and one end of R2 being coupled to the supply +12 volts. Another resistor R3 is coupled from the connecting node of R1 and R2 to an inverting input (−) of an operational amplifier A1, which may be a LMV722, for example, and an emitter of a PNP transistor Q1, which may be a 2N2907 transistor, for example. The amplifier A1 may be also powered by the +12 volt supply. Another voltage divider network comprising resistors R4 and R5 is coupled between the regulated supply +12 volts and the data input connection, one end of R4 being connected to the supply and one end of R5 being connected to the data input. The connecting node of R4 and R5 is connected to a non-inverting (+) input of A1. A resistor R6 is coupled between the output of A1 and the base of Q1.

Note that Q1 is biased in a quiescent active state by the voltage at the node between R4 and R5 when no data is present, i.e. data=zero volts. In this state, Q1 produces a bias current at the collector of Q1. When data is present, there is a voltage at the data connection end of R5 which causes the node voltage between R4 and R5 to vary in proportion thereto. The amplifier A1 is operative to keep the voltages at its − and + inputs substantially equal. Accordingly, the voltage at the end of R3 (emitter of Q1) or − input of A1 will track the voltage at the node of R4 and R5 or + input of A1. The amplifier A1 is also operative to control Q1 to pass the current through R3 to its collector, which current being proportional to the voltage difference across R3.

Accordingly, as the data voltage increases, the voltage at R4/R5 connecting node increases, the voltage difference across R3 decreases and the modulating current (collector of Q1) decreases in proportion thereto. In response, the switching frequency will decrease (see FIG. 3). Likewise, as the data voltage decreases, the voltage at R4/R5 connecting node decreases, the voltage difference across R3 increases and the modulating current (collector of Q1) increases in proportion thereto. In response, the switching frequency will increase (see FIG. 3). In this manner, the switching frequency may be frequency modulated by the voltage at the data input.

An example application in which only two frequencies are desired for frequency modulation may be for the controller 20 to control the on/off states of two video cameras of a commercial vehicle which may be accomplished with FM encoding the switching frequency of the ripple voltage between first and second frequencies. The decoding of the first frequency by the decoder 24 will result in turning on one video camera and turning off the other and the decoding of the second frequency will result in turning on the other video camera and turning off the one video camera, for example. An exemplary circuit shown in the dashed lines of FIG. 4 may be added to the embodiment for this simple application.

Referring to FIG. 4, within the dashed lines is a circuit comprising a capacitor C1 which may be coupled between the collector of Q1 and a collector of a NPN transistor Q2, which may be a 2N2222 transistor, for example. A resistor R8 is coupled between the supply +12 volts and the base of Q2. A switch S1 may be coupled between one end of R8 and the supply. Another resistor R7 may be connected from the base of Q2 to ground. The emitter of Q2 may be connected to ground. Thus, when the switch S1 is closed, current is provided from the +12 volt supply to the base of Q2 to turn Q2 on. In this state, current is conducted from the collector of Q1 through Q2 to ground, thereby decreasing the modulation current and, in turn, decreasing the switching frequency from a first frequency to a second frequency. When switch S1 is opened, Q2 is non-conducting, returning the modulation current to the level of the first frequency. The dashed line circuit of FIG. 4 may also be used to transmit serially a digital signal by FM modulating the switching frequency of the SMPS. In this example, a serial digital signal may be applied at the one end of R8 which will cause the switching frequency to switch between the first and second frequencies in accordance with the serially input data.

Suitable values for the components of the circuitry of FIG. 4 may be as follows:
R1=10.0 KΩ
R2=10.0 KΩ
R3=100 KΩ
R4=10.0 KΩ
R5=10.0 KΩ
R6=1.0 KΩ
R7=15 KΩ
R8=15 KΩ
C1=27 pf For this two frequency example, a fixed value of source current provided by the control circuit of the SMPS 10 may be determined as follows. If a UC2874-2 integrated circuit (IC) is used for the control circuit, an average current mode control is established in the IC. For the UC2874-2 control IC, the saw tooth wave form frequency, $f_{sw}=(1/14250 C_T)$, where $C_T$ is the timing capacitor, $=1/T_{sw}$. It is known that $C_T V_{pp}=IT$, or $I=C_T V_{pp}/T=C_T V_{pp} f_{sw}$. By substituting $1/14250 C_T$ for $f_{sw}$, in the latter expression, we obtain the expression $(C_T V_{pp}/14250 C_T)$, which equals the expression $(V_{pp}/14250)$. In the present embodiment, the saw tooth wave form is permitted to vary from 1.0V min. to 4.0V max., i.e. $V_{pp}$=3.0V. Thus, if 3.0 volts is input into the expression $V_{pp}/14250$, then the fixed value of source current, I=210.5 µA. If the source current may be deviated by ±5%, then, a varying current, $I_G$=±10 µA.

Assume that for the present example, the two modulating frequencies are 1.0 kHz and 2.0 kHz and the deviation frequency (DF) is ±10 kHz. The peak to peak current, $I_G$, sets the deviation frequency, DF, while $f_G$ of $V_R$ sets the rate. If the charging capacitor is chosen to be approximately 330 pf, the fixed or rest carrier frequency is $f_{SW}$=1/(14250)(330 pf)=212.65 kHz. If this frequency is deviated by ±10 kHz as noted above, the instantaneous $f_{max}$ and $f_{min}$ deviation bounds are 222.65 kHz and 202.65 kHz, respectively. Using the higher modulating frequency of $f_m$=2.0 kHz with DF=10 kHz, the $m_f$=modulation index=DF/$f_m$=10/2=5.0. Using reference tables for Bessel functions $J_n$ (5) is >0.010 for n≦8, and $J_n$ (5)<0.010 for n>8. Therefore, the spectrum will contain 8 sidebands, or $f_c$±8 (2.0 kHz)=$f_c$±16 kHz. So, for a modulating frequency of 2 kHz, the frequency carrier $f_c$ will vary from 196.65 kHz min. to 228.65 kHz max.

If, on the other hand, $f_m$=1.0 kHz, then $m_f$=10/1 or $m_f$=10. Again using Bessel tables for $m_f$=10, yields 14 sidebands on each side of the carrier, i.e. $f_c$=±14 kHz. So, for a modulating frequency of 1 kHz, the carrier frequency $f_c$ will vary from 198.65 kHz min. to 226.65 kHz max. If a tolerance of ±20% is considered, then max $f_c$ would be 272 kHz which places the $2^{nd}$ harmonic at 544 kHz, just at the edge of the AM band.

Figure 5:
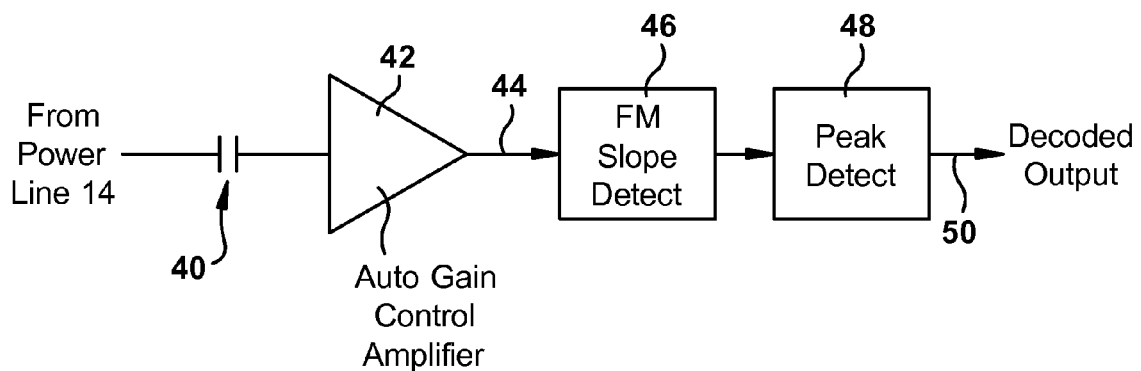
FIG. 5 is a block diagram schematic of an exemplary FM decoder unit.

Once the switching frequency of the SMPS 10 is FM encoded as noted above, the output ripple voltage will contain the desired FM artifacts. This ripple voltage will be FM decoded at the receiving end 18 of the power line 14 by the FM decoder unit 24. A block diagram schematic of an exemplary FM decoder unit 24 is shown in FIG. 5. Referring to FIG. 5, the ripple voltage may be ac-coupled from the power line 14 by a coupling network 40 comprising a capacitor, and amplified by an auto-gain-control, AGC, amplifier 42. In the present embodiment, the AGC amplifier 42 may comprise a single operational amplifier, which may be a LMH6643, for example. The amplifier 42 may be configured as a 1-zero, 2-pole inverting amplifier filter having a DC offset and a mid-frequency gain of −15, for example. In addition, the amplifier filter 42 may be set with corner frequencies of 106 kHz, where frequency response slope goes from +1 to 0, and 1.06 MHz, where the frequency response slope goes from 0 to −1. The filtered and amplified output 44 of the amplifier 42 may be FM-decoded by a circuit comprising a FM slope detector 46 and a peak detector 48 which yields the decoded data signal 50.

Figure 6:
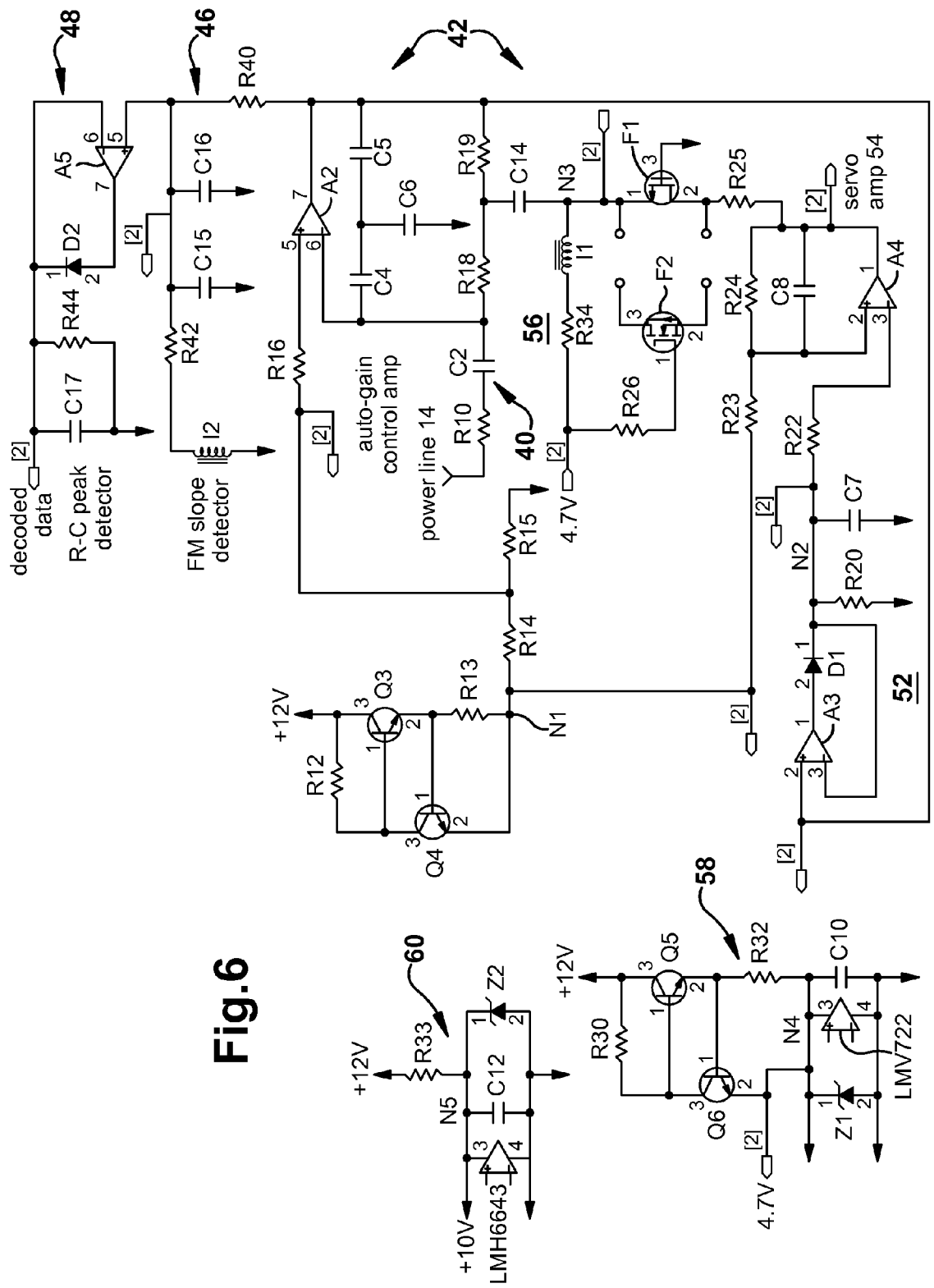
FIG. 6 is a circuit schematic of an exemplary FM decoder unit.

An exemplary circuit for embodying the FM decoder 24 is shown in the circuit diagram of FIG. 6. Referring to FIG. 6, a resistor R10 is coupled at one end to the power line 14 and at the other end to a capacitor C2. The series combination of R10 and C2 form the coupling network 40. The other end of C2 is coupled to an inverting (−) input of the operational amplifier A2 of the AGC circuit 42. The AGC circuit implementation for the present embodiment comprises a first stage variable-gain amplifier using op amp A2 with a junction field effect transistor (JFET) F1 or an enhancement-mode metal oxide semiconductor field effect transistor (MOSFET) F2 in the feedback loop for gain control as will be better understood from the description found herein below.

A bias circuit comprising back to back NPN transistors Q3 and Q4 provides a regulated bias voltage at node N1 to the AGC circuitry 42. The transistors Q3 and Q4 may be 2N2222 transistors, for example. The collector of Q3 is coupled to the power line supply (e.g. +12 V) and the collector of Q4 is coupled to the power line supply through a resistor R12 and to the base of Q3. The emitter of Q3 is coupled to the node N1 through a resistor R13 and to the base of Q4 and the emitter of Q4 is coupled directly to the node N1. Connected from node N1 to ground potential is a voltage divider network comprising resistors R14 and R15 and the R14/R15 connecting node is coupled to a non-inverting (+) input of the amplifier A2 through a resistor R16.

The feedback loop of A2 includes: a capacitor T-circuit comprising capacitors C4, C5 and C6, wherein C4 is coupled at one end to the − input of A2, C4 and C5 are connected in series, C5 is coupled to the output of A2, and C6 is connected between the C4/C5 connecting node and ground potential; and a pair of resistors R18 and R19 connected in series across A2 from output to − input, i.e. in parallel with the series capacitors C4 and C5. Also included in the feedback loop of A2 are: an operational amplifier, half-wave rectifier R-C/peak detector circuit 52; a servo amplifier circuit 54 to drive the JFET F1 or MOSFET F2 source terminal to adjust gain; and an R-L-C slope detector circuit 56 to decode the FM signal.

The circuit 52 comprises: an operational amplifier A3, which may be a LMV722 amplifier, for example, having its non-inverting (+) input connected to the output of A2 (amplified and filtered ripple voltage); a diode D1 connected between the output of A3 and its inverting (−) input, anode-to-cathode; and a parallel R-C network including R20 and C7 coupled from the cathode of D1 to ground potential, the cathode of D1, R20 and C7 being connected together at a connecting node N2. Accordingly, at the node N2 is formed the peak ripple voltages of the amplified power line voltage ripple.

The servo amplifier circuit 54 comprises an operational amplifier A4, which may be a LMH6643 amplifier, for example, having its + input coupled to node N2 through a resistor R22. The − input of A4 is connected to node N1 through a resistor R23 and to the output of A4 through a feedback resistor R24. Coupled in parallel across R24 is a capacitor C8. The servo amplifier circuit 54 is operative to amplify and filter the ripple voltage peaks at node N2. A bias voltage is provided by the node N1. The output of A4 drives the source of either F1 or F2 through a resistor R25. Note that if F1 is used in the feedback loop of A2, then F2 remains unconnected and the gate of F1 is grounded and the drain connection thereof is connected to a circuit node N3. On the other hand, if F2 is to be used, its source and drain terminals may be connected to the circuit terminals of R25 and node N3, respectively, and F1 may be removed from the circuit. The gate of F2 is connected to a regulated bias voltage which may be +4.7 volts, for example, through a resistor R26.

In the present embodiment, the +4.7 volt bias voltage is produced by circuit 58 which comprises back to back connected NPN transistors Q5 and Q6. The transistors Q5 and Q6 may be 2N2222 transistors, for example. The collector of Q5 is coupled directly to the power line supply (e.g. +12 V) and the collector of Q6 is coupled to the power line supply through a resistor R30 and to the base of Q5. The emitter of Q5 is coupled to the node N4 through a resistor R32 and to the base of Q6 and the emitter of Q6 is coupled directly to the node N4. A 4.7 volt zener diode Z1 is coupled from the node N4 to ground potential to establish the regulated voltage +4.7 volts at node N4. The node N4 may form a supply bus which may be distributed through the circuit 24 to power the LMV722 type operational amplifiers thereof as shown by way of example by the circuit 58. A ground bus may form a return from the LMV722 amplifiers to the circuit 58. Coupled across the supply and return terminals of each LMV722 amplifier may be a filter capacitor C10.

The LMH6643 type amplifiers of the circuit 24 may be powered by a regulated +10 volts produced by the exemplary circuit 60. The circuit 60 includes a +10 volt zener diode Z2 which is coupled to the +12 volt supply power line through a resistor R33, and directly to ground potential. The connection node N5 between R33 and Z1 may form a supply bus which may be distributed through the circuit 24 to power the LMH6643 type operational amplifiers thereof as shown by way of example by the circuit 60. A ground bus may form a return from the LMH6643 amplifiers to the circuit 60. Coupled across the supply and return terminals of each LMH6643 amplifier may be a filter capacitor C12.

The slope detector circuit 56 comprises a series network of a resistor 34 and inductor I1 coupled across node N3 and the +4.7 volt supply bus. The series network may be set at a resonant frequency of approximately 309 kHz, for example. The node N3 is coupled to the R18/R19 connection point through a capacitor C14 which completes the feedback loop of the AGC circuit 42.

The output of the operational amplifier A2 may drive a 1.0 KΩ series resistor R40 to provide a current-source characteristic into the single-ended passive slope detector circuit 46 which may be an R-L-C network comprising a series combination of resistor R42 and inductor I2 coupled from RA0 to ground potential and parallel capacitors C15 and C16 coupled from R40 to ground potential. In the present example, the R-L-C network 46 may be configured with resonant frequency of approximately 309 kHz, for example. The final peak detector circuit 48 comprises: an operational amplifier A5, which may be a LMV722 amplifier, for example, configured as a half-wave rectifier including a diode D2 coupled anode-to cathode between the output of A5 and an inverting (−) input thereof, the resistor R40 being coupled to a non-inverting (+) input of A5. In addition, a parallel combination of a resistor 44 and capacitor C17 is coupled from the inverting (−) input of A5 and ground potential. The modulating frequency of the power line ripple voltage is recovered by the circuits 46 and 48 and output as decoded data.

Suitable component values for the exemplary decoder circuit of FIG. 6 are as follows:

| For Circuit 42: | | | |
|---|---|---|---|
| R12 = 22 KΩ | R13 = 150 Ω | R14 = 100 Ω | R15 = 100 Ω |
| R10 = 1.0 KΩ | C2 = 1.5 nf | R16 = 20 KΩ | C4 = 10 pf |
| C5 = 10 pf | C6 = 100 pf | R18 = 10 KΩ | R19 = 10 KΩ |
| R20 = 10 KΩ | C7 = 470 pf | R22 = 4.7 KΩ | R23 = 4.7 KΩ |
| R24 = 470 KΩ | C8 = 10 pf | R25 = 1.0 KΩ | R26 = 100 Ω |
| R34 = 100 Ω | I1 = 270 μh | C14 = 0.1 μf | R40 = 1.0 KΩ |
| For Circuit 46: | | | |
| I2 = 180 μh | R42 = 100 Ω | C15 = 470 pf | C16 = 1.0 nf |
| For Circuit 48: | | | |
| R44 = 15 KΩ | C17 = 0.1 μf | | |
| For Circuit 58: | | | |
| R30 = 22 KΩ | R32 = 100 Ω | C10 = 0.1 μf | |
| For Circuit 60: | | | |
| R33 = 220 Ω | C12 = 0.1 μf | | |

Note that in the present embodiment, no coupling capacitor or transformer circuits are used to couple the encoded data onto the power line. In addition, there is no loading of the encoder and decoder networks by reflected impedances. In the present embodiment, the encoded signal is embedded in the ripple voltage which is an inherent artifact associated with SMPS systems. In other words, the undesired ripple voltage of SMPS systems is being put to use in the present embodiment to convey data and information over the power lines without the use of additional communication wires or capacitive and/or inductive/transformer coupling networks. A by-product of the present embodiment is that the EMI/RFI emissions of the modulated power line voltage ripple has a frequency distribution spread out over a spectrum of frequencies rather than concentrated at a single frequency, rendering it easier to attenuate through filtering.

While the present invention has been described by one or more embodiments herein above, it is understood that such embodiments were presented merely by way of example with no intent of limiting the invention in any way. Accordingly, the present invention should not be limited by such embodiments, but rather construed in breadth and broad scope in accordance with the recitation of the claims appended hereto.

What is claimed is:

1. Method of transmitting data over a power line of a switch mode power supply system, said method comprising:
   encoding a switch frequency of the switch mode power supply with said data;
   generating a voltage by the switch mode power supply, having a ripple voltage at said switch frequency;
   conducting said ripple voltage over the power line of said system;
   de-coupling said ripple voltage from the power line; and
   decoding said data from the encoded switch frequency of said coupled ripple voltage.

2. The method of claim 1 wherein the step of encoding includes frequency modulating the switch frequency of the ripple voltage with the data; and wherein the step of decoding includes frequency demodulating the data from the modulated switch frequency of the coupled ripple voltage.

3. The method of claim 2 including producing the switch frequency of the switch mode power supply by a timing waveform governed by a current.

4. The method of claim 3 wherein the step of frequency modulating the switch frequency includes modulating the governing current of the timing waveform.

5. The method of claim 3 wherein the timing waveform is produced by charging a capacitor with a charging current; and wherein the step of frequency modulating the switch frequency includes mixing a modulation current with the governing current to form a composite charging current of the timing waveform.

6. The method of claim 2 wherein the step of frequency demodulating includes detecting slopes of the coupled ripple voltage and generating first signals indicative thereof.

7. The method of claim 6 wherein the step of frequency demodulating includes detecting peaks of the first signals and generating second signals indicative thereof.

8. The method of claim 7 wherein the step of frequency demodulating includes filtering the second signals to produce the decoded data.

9. The method of claim 1 wherein the step of encoding includes modulating the switch frequency of the ripple voltage about a rest frequency.

10. The method of claim 1 wherein the step of decoding includes amplifying the coupled ripple voltage with an auto gain control amplifier.

11. System for transmitting data over a power line comprising:
a switch mode power supply to generate a voltage on the power line at a switch frequency and having a ripple voltage over the power line at the switch frequency;
a first circuit for encoding the switch frequency of the ripple voltage with said data; and
a second circuit for de-coupling said ripple voltage from the power line and for decoding said data from the encoded switch frequency of said coupled ripple voltage.

12. The system of claim 11 wherein the first circuit includes a circuit for frequency modulating the switch frequency of the ripple voltage with the data; and wherein the second circuit includes a circuit for frequency demodulating the data from the modulated switch frequency of the coupled ripple voltage.

13. The system of claim 12 wherein the switch mode power supply generates a timing waveform governed by a current for producing the switch frequency thereof; and wherein the circuit for frequency modulating the switch frequency includes a circuit for modulating the governing current of the timing circuit.

14. The system of claim 13 wherein the timing waveform is produced by charging a capacitor with the governing current; and wherein the circuit for frequency modulating the switch frequency includes a circuit for mixing a modulation current with the governing current to form a composite charging current of the timing waveform.

15. The system of claim 12 wherein the circuit for frequency demodulating includes a circuit for detecting slopes of the coupled ripple voltage and generating first signals indicative thereof.

16. The system of claim 15 wherein the circuit for frequency demodulating includes a circuit for detecting peaks of the first signals and generating second signals indicative thereof.

17. The system of claim 16 wherein the circuit for frequency demodulating includes a circuit for filtering the second signals to produce the decoded data.

18. The system of claim 11 wherein the first circuit includes a circuit for modulating the switch frequency of the ripple voltage about a rest frequency.

19. The system of claim 11 wherein the second circuit includes an amplifier circuit for amplifying the coupled ripple voltage with an auto gain control.

\* \* \* \* \*